US012761680B2

(12) United States Patent
Okada

(10) Patent No.: US 12,761,680 B2
(45) Date of Patent: Oct. 13, 2026

(54) POWER CONTROL DEVICE AND POWER SUPPLY DEVICE

(71) Applicant: ROHM CO., LTD., Kyoto (JP)

(72) Inventor: Tatsuya Okada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 121 days.

(21) Appl. No.: 18/654,104

(22) Filed: May 3, 2024

(65) Prior Publication Data

US 2024/0281014 A1 Aug. 22, 2024

Related U.S. Application Data

(63) Continuation of application No. PCT/JP2022/037788, filed on Oct. 11, 2022.

(30) Foreign Application Priority Data

Nov. 18, 2021 (JP) ................................ 2021-187647

(51) Int. Cl.
*G05F 1/575* (2006.01)
*G05F 3/26* (2006.01)

(52) U.S. Cl.
CPC .............. *G05F 1/575* (2013.01); *G05F 3/262* (2013.01)

(58) Field of Classification Search
CPC ... G05F 1/10; G05F 1/46; G05F 1/461; G05F 1/462; G05F 1/463; G05F 1/465; G05F 1/466; G05F 1/467; G05F 1/56; G05F 1/562; G05F 1/563; G05F 1/565; G05F 1/575; G05F 1/577; G05F 1/585; G05F 1/59; G05F 1/595; G05F 1/607; G05F 1/61; G05F 1/613; G05F 1/614; G05F 1/618; G05F 1/62; G05F 1/66; G05F 3/02;

(Continued)

(56) References Cited

U.S. PATENT DOCUMENTS

2008/0088286 A1* 4/2008 Cho .......................... G05F 1/56 323/280
2014/0340067 A1* 11/2014 Zhong ...................... G05F 1/575 323/311
2021/0382510 A1 12/2021 Takobe et al.

FOREIGN PATENT DOCUMENTS

JP 2006-301787 11/2006
JP 2011-242945 12/2011
WO WO 2020/090551 5/2020

OTHER PUBLICATIONS

International Search Report and Written Opinion in International Appln. No. PCT/JP2022/037788, mailed on Dec. 6, 2022, 15 pages (with machine translation).

(Continued)

*Primary Examiner* — Bryan R Perez

(74) *Attorney, Agent, or Firm* — Fish & Richardson P.C.

(57) ABSTRACT

A power control device serves as a main controlling agent in a power supply device which generates an output voltage from an input voltage using an output transistor, and includes: an output feedback circuit configured to receive the output voltage or a feedback voltage corresponding to it to generate a driving signal for the output transistor; a current feedback signal generation circuit configured to generate a current feedback signal for adjusting the phase characteristics of the output feedback circuit according to an output current of the power supply device; and a delay circuit configured to delay a change in the current feedback signal in response to a change in the output current.

15 Claims, 6 Drawing Sheets

(58) Field of Classification Search
CPC ... G05F 3/30; G05F 3/22; G05F 3/222; G05F 3/242; G05F 3/225; G05F 3/245; G05F 3/20; G05F 3/00; G05F 3/08; G05F 3/10; G05F 3/16; G05F 3/18; G05F 3/185; G05F 3/227; G05F 3/247; G05F 3/26; G05F 3/265; G05F 3/24; G05F 3/262
See application file for complete search history.

(56) References Cited

OTHER PUBLICATIONS

JP OA—Japanese Patent Office, Office Action in Japanese Appln. No. 2023-561447, dated Jul. 21, 2026, 10 pages (with English Translation).

* cited by examiner

POWER CONTROL DEVICE AND POWER SUPPLY DEVICE

CROSS-REFERENCE TO RELATED APPLICATIONS

This nonprovisional application is a continuation application of International Patent Application No. PCT/JP2022/037788 filed on Oct. 11, 2022, which claims priority Japanese Patent Application No. 2021-187647 filed on Nov. 18, 2021, the entire contents of which are hereby incorporated by reference.

TECHNICAL FIELD

The disclosure herein relates to a power control device and a power supply device.

BACKGROUND ART

Conventionally, power control devices have been developed that have a function of feeding information on an output current back to a driver.

An example of known technology related to what has just been mentioned is seen in Patent Document 1 identified below.

CITATION LIST

Patent Literature

Patent Document 1: WO2020/090551

DESCRIPTION OF EMBODIMENTS

<Power Supply Device (Comparative Example)>

Figure 1:
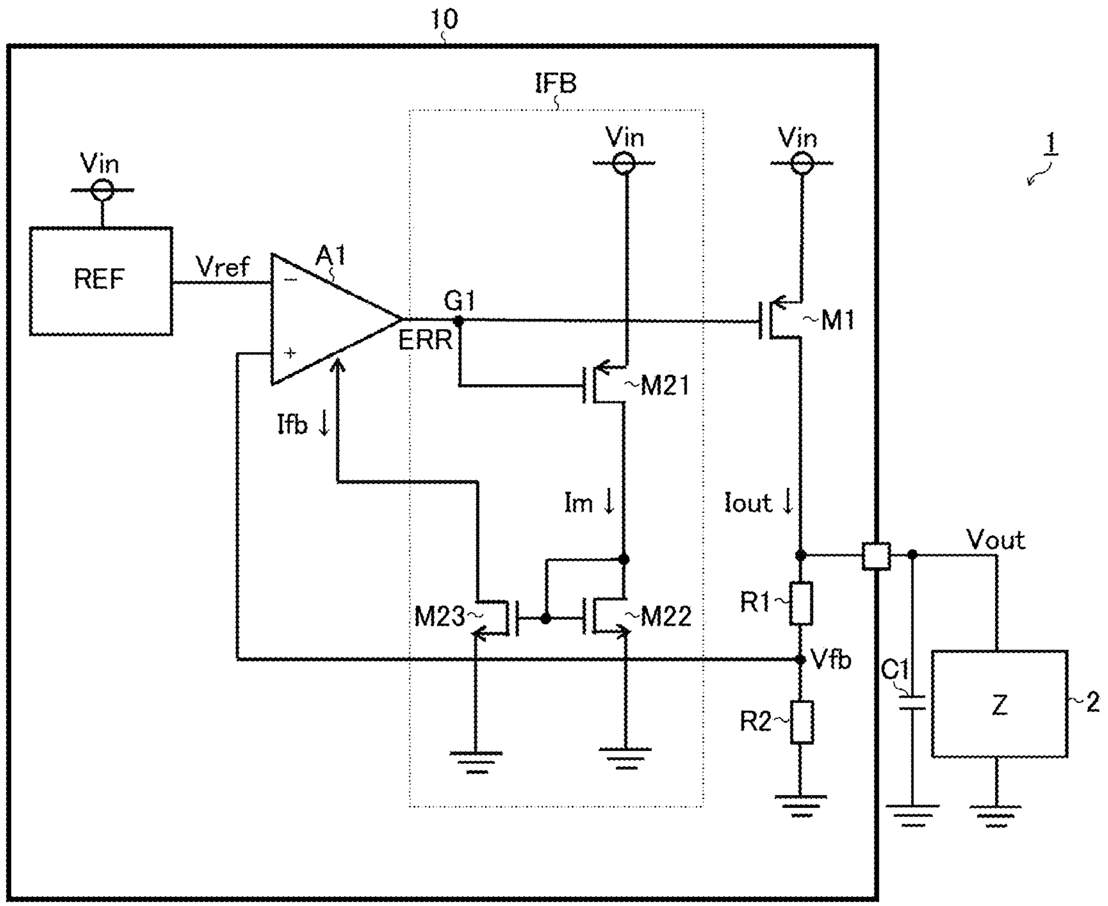
FIG. 1 is s a diagram showing a comparative example of a power supply device.

FIG. 1 is a diagram showing a comparative example (a common configuration example to be compared with the embodiments described later) of a power supply device. The power supply device 1 of this comparative example is an LDO (low-dropout) regulator (a kind of linear regulator) that generates from an input voltage Vin an output voltage Vout (≤Vin) to feed it to a load 2 and includes an output transistor M1 (PMOSFET [p-channel metal-oxide-semiconductor field-effect transistor] in the diagram), a reference voltage generation circuit REF, an error amplifier A1, resistors R1 and R2, a capacitor C1, and a current feedback signal generation circuit IFB.

The output transistor M1 is connected between an input terminal for the input voltage Vin and an output terminal for the output voltage Vout and is driven according to a gate driving signal G1.

The source of the output transistor M1 is connected to the input terminal for the input voltage Vin. The drain of the output transistor M1 is connected to the output terminal for the output voltage Vout. The gate of the output transistor M1 is connected to an application terminal for the gate driving signal G1. The on-resistance Ron1 of the output transistor M1 is variably controlled according to the gate driving signal G1.

As the gate driving signal G1 increases, the gate-source voltage Vgs1 of the output transistor M1 decreases; thus the on-resistance Ron1 of the output transistor M1 increases and an output current Iout passing through the output transistor M1 decreases. In contrast, as the gate driving signal G1 decreases, the gate-source voltage Vgs1 of the output transistor M1 increases; thus the on-resistance Ron1 of the output transistor M1 decreases and the output current Iout out passing through the output transistor M1 increases.

The resistors R1 and R2 are connected in series with each other between the output terminal for the output voltage Vout and a ground terminal. The resistors R1 and R2 function as a voltage divider circuit that outputs from the connection node between them a feedback voltage Vfb (={R2/(R1+R2)}×Vout) corresponding to the output voltage Vout. In a case where the output voltage Vout is within the input dynamic range of the error amplifier A1, the resistors R1 and R2 may be omitted, in which case the output voltage Vout can be fed directly to the error amplifier A1.

The capacitor C1 is connected in series between the output terminal for the output voltage Vout and the grounded terminal. The capacitor C1 functions as a smoothing means for the output voltage Vout.

The reference voltage generation circuit REF generates a predetermined reference voltage Vref from the input voltage Vin. Suitably used as the reference voltage generation circuit REF is, for example, a band-gap reference voltage source with flat input voltage dependence and temperature dependence.

The error amplifier A1 generates an error signal ERR between the feedback voltage Vfb, which is fed to its non-inverting input terminal (+), and the reference voltage Vref, which is fed to its inverting input terminal (−), to output the error signal ERR as the gate driving signal G1. Thus, the gate driving signal G1 lowers when the feedback voltage Vfb is lower than the reference voltage Vref, and rises when the feedback voltage Vfb is higher than the reference voltage Vref. The error amplifier A1 can be understood as one example of an output feedback circuit configured to receive the output voltage Vout or the feedback voltage Vfb corresponding to it to generate the gate driving signal G1 for the output transistor M1.

The current feedback signal generation circuit IFB generates a current feedback signal Ifb for adjusting the phase characteristics of the output feedback circuit (in particular, the error amplifier A1) according to the output current Iout out of the power supply device 1.

Of the circuit elements described above, the output transistor M1, the reference voltage generation circuit REF, the error amplifier A1, the resistors R1 and R2, and the current feedback signal generation circuit IFB may be integrated in a power control device 10 (a semiconductor device that serves as the principal controlling agent in the power supply device 1; what is called a power control IC). The output transistor M1 and the resistors R1 and R2 may be externally connected to the power control device 10.

<Current Feedback Signal Generation Circuit>

With reference still to FIG. 1, the configuration and operation of the current feedback signal generation circuit IFB will be described. The current feedback signal generation circuit IFB includes a mirror transistor M21 (PMOSFET in the diagram) and transistors M22 and M23 (both NMOSFETs [n-channel MOSFETs] in the diagram).

The mirror transistor M21 is driven by the gate driving signal G1, which it shares with the output transistor M1, to generate a mirror current Im that increases and decreases in a similar manner as the output current Iout.

The source of the mirror transistor M21 is connected to the input terminal for the input voltage Vin. The drain of the mirror transistor M21 (i.e., an output terminal for the mirror current Im) is connected to the drain of the transistor M22. The gate of the mirror transistor M21 is connected to the application terminal for the gate driving signal G1. The on-resistance Ron21 of the mirror transistor M21 is variably controlled according to the gate driving signal G1.

As the gate driving signal G1 increases, the gate-source voltage Vgs21 of the mirror transistor M21 decreases; thus the on-resistance Ron21 of the mirror transistor M21 increases and the mirror current Im passing through the mirror transistor M21 decreases. In contrast, as the gate driving signal G1 decreases, the gate-source voltage Vgs21 of the mirror transistor M21 increases; thus the on-resistance Ron21 of the mirror transistor M21 decreases and the mirror current Im passing through the mirror transistor M21 increases.

The size of the transistor M21 is smaller than the size of the output transistor M1. Thus, the mirror current Im is smaller than the output current Iout.

The drain of the transistor M22 is, as described above, connected to the drain of the mirror transistor M21 (i.e., the output terminal for the mirror current Im). The gates of the transistors M22 and M23 are both connected to the drain of the transistor M22. The sources of the transistors M22 and M23 are both connected to the ground terminal. The drain of the transistor M23 (i.e., an output terminal for the current feedback signal Ifb) is connected to the output feedback circuit (in particular, to the error amplifier A1).

So connected, the transistors M22 and M23 function as a current mirror that, by mirroring the mirror current Im in a predetermined mirror ratio a, generates the current feedback signal Ifb (=$\alpha \times$Im).

The output feedback circuit that receives the current feedback signal Ifb controls the characteristics of the error amplifier A1 according to the current feedback signal Ifb so as to obtain desired frequency characteristics. For example, the error amplifier A1 can be configured so as to, as the current feedback signal Ifb (and hence the output current Iout) increases, decrease the gain, shift the zero-crossing frequency lower, decrease the drive current, or control a pole or zero point.

<Discussion on Load Response Characteristics>

In the power supply device 1 of the above comparative example, while it is easy to obtain desired frequency characteristics, there is room for further improvement in load response characteristics.

Based on the above discussion, the following description presents a novel embodiment that provides desired frequency characteristics without sacrificing load response characteristics.

<Power Supply Device (First Embodiment)>

Figure 2:
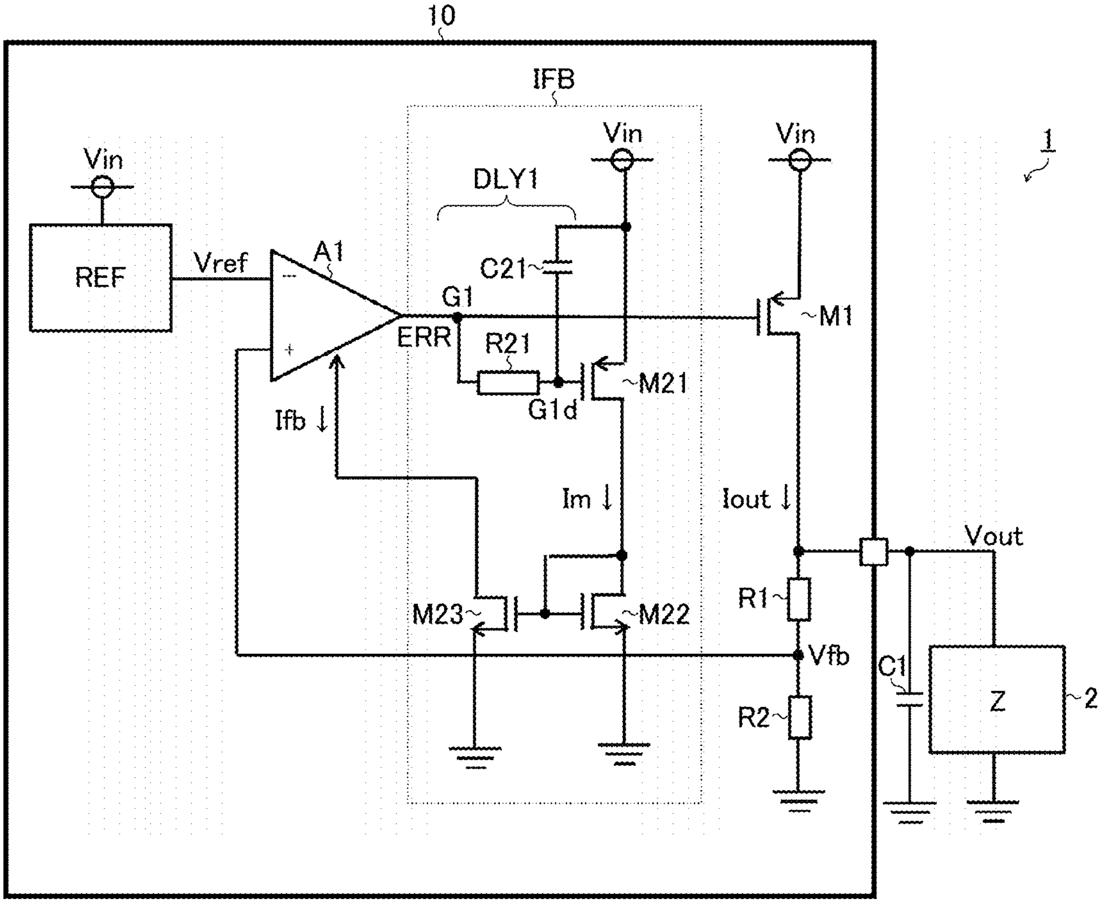
FIG. 2 is a diagram showing a power supply device according to a first embodiment.

FIG. 2 is a diagram showing a first embodiment of the power supply device 1. The power supply device 1 of this embodiment is based on the comparative example (FIG. 1) discussed previously and further includes a delay circuit DLY1. Accordingly, such components as have already been mentioned are identified by the same reference signs as in FIG. 1, and no overlapping description will be repeated. The following description focuses on the features unique to this embodiment.

The delay circuit DLY1 is a circuit block configured to delay a change in the current feedback signal Ifb in response to a change in the output current Iout, and includes a resistor R21 and a capacitor C21.

The resistor R21 is connected between the application terminal for the gate driving signal G1 and the gate of the mirror transistor M21. The capacitor C21 is connected between the gate and the source of the mirror transistor M21.

Thus connected, the resistor R21 and the capacitor C21 function as an RC filter that gives the gate driving signal G1 a delay and thereby generates a delayed driving signal G1*d* to feed it to the gate of the mirror transistor M21.

Figure 3:
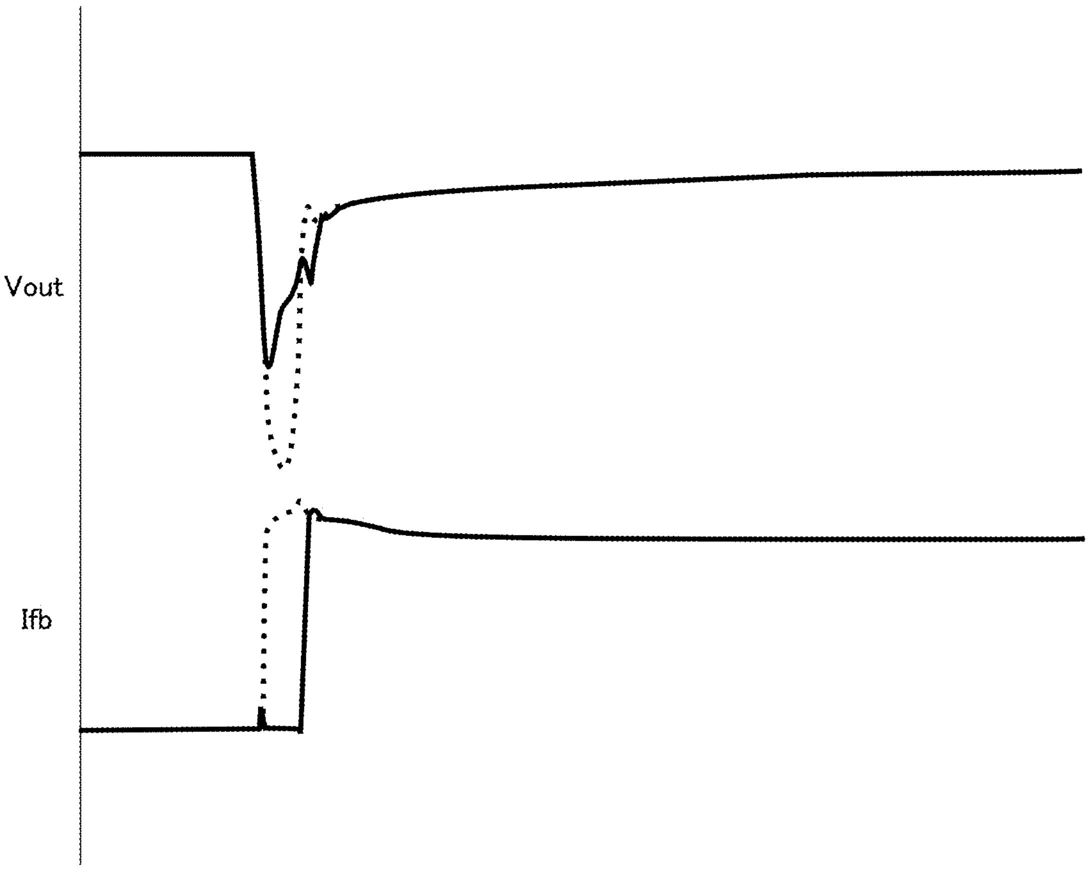
FIG. 3 is a diagram showing one example of current feedback operation.

FIG. 3 is a diagram showing one example of current feedback operation, illustrating, from top down, the output voltage Vout and the current feedback signal Ifb. Solid lines indicate the behavior in the first embodiment (FIG. 2), and broken lines indicate behavior in the comparative example (FIG. 1).

As indicated by the broken lines in the diagram, in the comparative example (FIG. 1) described previously, the current feedback signal Ifb is made to follow without delay a load variation (an increase in the output current Iout in the diagram) with a view to, for example, lowering the gain of the error amplifier A1. While this helps stabilize the phase characteristics, degraded load response characteristics causes a large variation (a drop in the diagram) in the output voltage Vout.

By contrast, as indicated by the solid lines in the diagram, in this embodiment (FIG. 2), even if a load variation occurs, the current feedback signal Ifb is not made to follow it without delay with a view to keeping the gain of the error amplifier A1 at the level before the load variation. This helps enhance the load response characteristics, and thus helps reduce variation in the output voltage Vout.

<Power Supply Device (Second Embodiment)>

Figure 4:
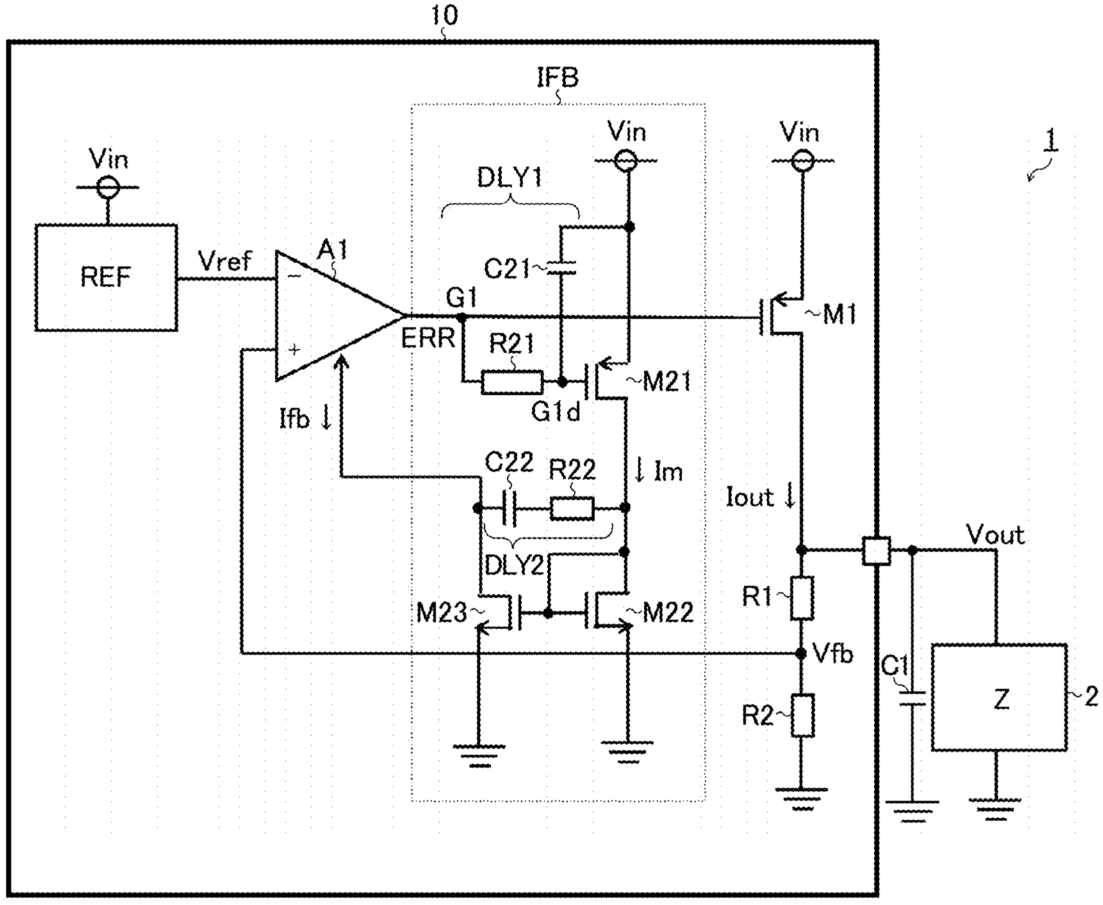
FIG. 4 is a diagram showing a power supply device according to a second embodiment.

FIG. 4 is a diagram showing a second embodiment of the power supply device 1. The power supply device 1 of this embodiment is based on the first embodiment (FIG. 2) discussed previously and further includes a delay circuit DLY2. Accordingly, such components as have already been mentioned are identified by the same reference signs as in FIG. 2, and no overlapping description will be repeated. The following description focuses on the features unique to this embodiment.

Like the delay circuit DLY1 described previously, the delay circuit DLY2 is a circuit block configured to delay a change in the current feedback signal Ifb in response to a change in the output current Iout, and includes a resistor R22 and a capacitor C22.

The resistor R22 and the capacitor C22 are connected in series with each other between the drain of the transistor M22 and the drain of the transistor M23, that is, between the input terminal and the output terminal of the current mirror.

So connected, the resistor R22 and the capacitor C22 function as an RC filter that delays a change in the current feedback signal Ifb output from the current mirror in response to a change in the mirror current Im input to the current mirror.

While the power supply device 1 of this embodiment includes both the delay circuits DLY1 and DLY2, a configuration is also possible where the delay circuit DLY1 is omitted and only the delay circuit DLY2 is included.

<Power Supply Device (Third Embodiment)>

Figure 5:
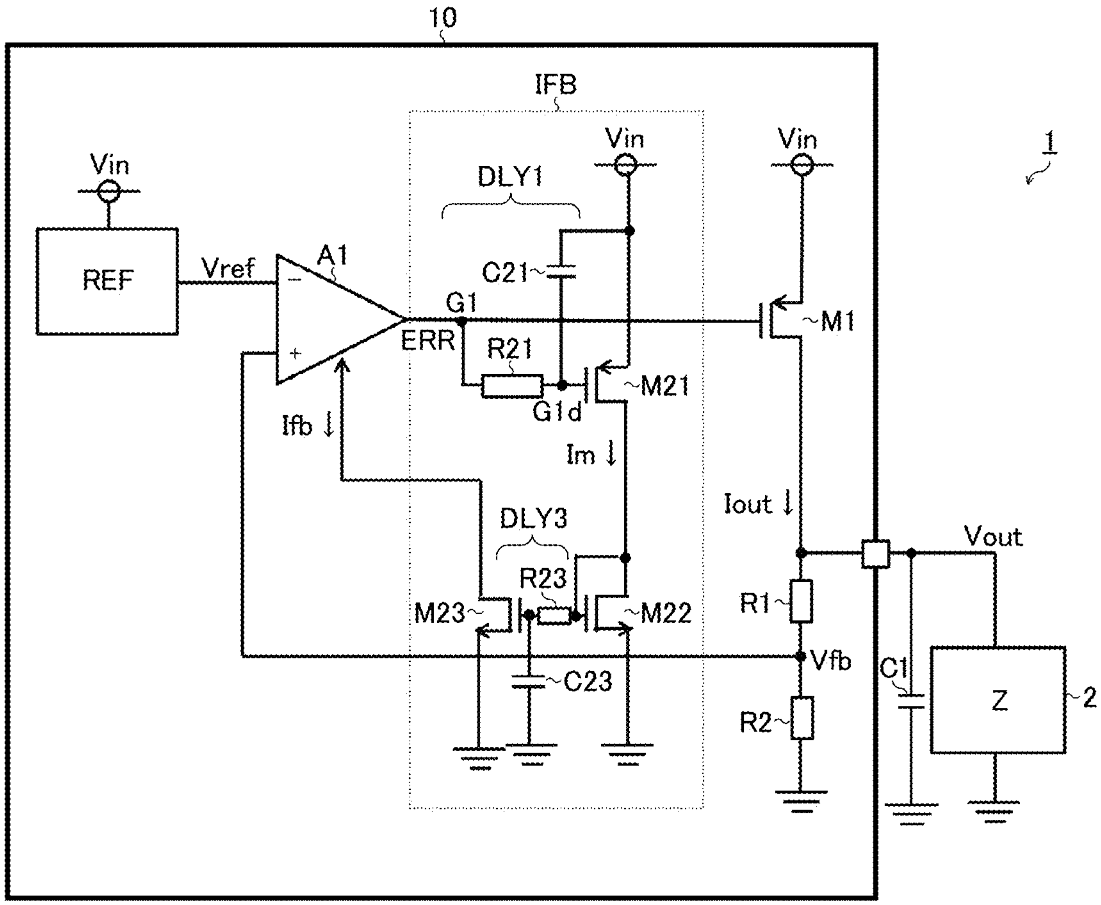
FIG. 5 is a diagram showing a power supply device according to a third embodiment.

FIG. 5 is a diagram showing a third embodiment of the power supply device 1. The power supply device 1 of this embodiment is based on the first embodiment (FIG. 2) discussed previously and further includes a delay circuit DLY3. Accordingly, such components as have already been mentioned are identified by the same reference signs as in FIG. 2, and no overlapping description will be repeated. The following description focuses on the features unique to this embodiment.

The delay circuit DLY3 is, like the delay circuit DLY1 described previously, a circuit block configured to delay a change in the current feedback signal Ifb in response to a change in the output current Iout, and includes a resistor R23 and a capacitor C23.

The resistor R23 is connected between the gate of the transistor M22 and the gate of the transistor M23. The capacitor C23 is connected between the gate of the transistor M23 and the ground terminal (one example of a constant potential terminal).

So connected, the resistor R23 and the capacitor C23, like the delay circuit DLY2 described previously, function as an RC filter that delays a change in the current feedback signal Ifb output from the current mirror in response to a change in the mirror current Im input to the current mirror.

While the power supply device 1 of this embodiment includes both the delay circuits DLY1 and DLY3, a configuration is also possible where the delay circuit DLY1 is omitted and only the delay circuit DLY3 is included. Or, a configuration is also possible where the delay circuits DLY2 and DLY3 are both included or the delay circuits DLY1 to DLY3 are all included.

<Power Supply Device (Fourth Embodiment)>

Figure 6:
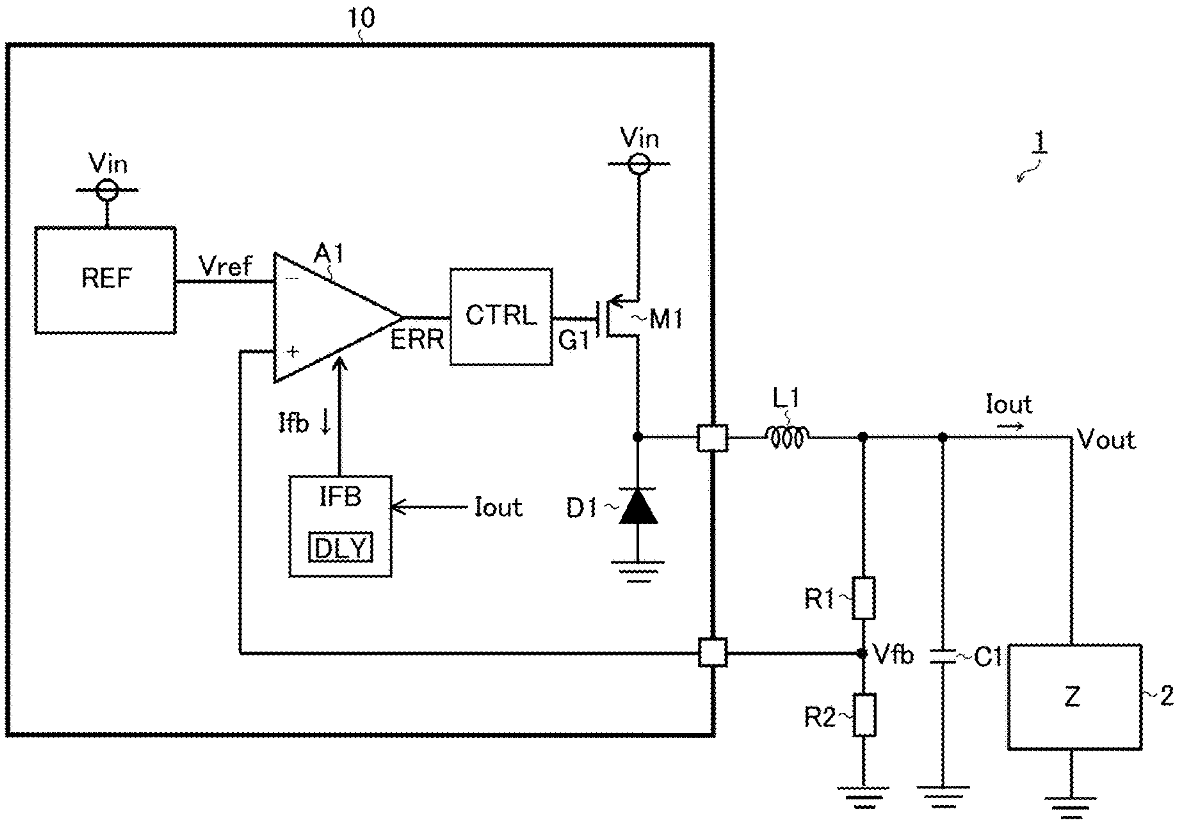
FIG. 6 is a diagram showing a power supply device according to a forth embodiment.

FIG. 6 is a diagram showing a fourth embodiment of the power supply device 1. The power supply device 1 according to this embodiment is configured not as an LDO regulator as described previously but as a switching regulator.

Specifically, an output stage of the power supply device 1 includes, in addition to the output transistor M1 described previously, a rectifier diode D1 and an inductor L1. The rectifier diode D1 can be replaced with a synchronous rectification transistor.

The output feedback circuit in the power supply device 1 includes a controller CTRL that performs PWM (pulse-width modulation) control for the output transistor M1 according to the error signal ERR output from the error amplifier A1.

Also the power supply device 1 of this embodiment has introduced in it the current feedback signal generation circuit IFB and the delay circuit DLY described previously.

In this way, the delay circuit DLY, which delays a change in the current feedback signal Ifb in response to a change in the output current Iout, can be introduced not only in LDO regulators but also in switching regulators.

The switching regulator is not limited to a buck type; it may instead be of a boost type, of a boost/buck type, or of an inverting type.

<Overview>

To follow is an overview of the various embodiments described above.

For example, according to one aspect of what is disclosed herein, a power control device is configured to serve as a main controlling agent in a power supply device which generates an output voltage from an input voltage using an output transistor. The power control device includes: an output feedback circuit configured to receive the output voltage or a feedback voltage corresponding to it to generate a driving signal for the output transistor; a current feedback signal generation circuit configured to generate a current feedback signal for adjusting the phase characteristics of the output feedback circuit according to the output current of the power supply device; and a delay circuit configured to delay a change in the current feedback signal in response to a change in the output current. (A first configuration.)

In the power control device according to the first configuration described above, preferably, the current feedback signal generation circuit includes: a mirror transistor configured to be driven according to the driving signal so as to generate a mirror current corresponding to the output current; and a current mirror configured to generate the current feedback signal from the mirror current. (A second configuration.)

In the power control device according to the second configuration described above, preferably, the delay circuit gives the driving signal a delay to generate a delayed driving signal and feeds it to the control terminal of the mirror transistor. (A third configuration.)

In the power control device according to the third configuration described above, preferably, the delay circuit includes a first resistor and a first capacitor. The first resistor may be connected between an application terminal for the driving signal and the control terminal of the mirror transistor, and the first capacitor may be connected between the control terminal of the mirror transistor and a main electrode of the mirror transistor. (A fourth configuration.)

In the power control device according to any of the second to fourth configurations described above, preferably, the delay circuit delays a change in the current feedback signal output from the current mirror in response to a change in the mirror current input to the current mirror. (A fifth configuration.)

In the power control device according to the fifth configuration described above, preferably, the delay circuit includes a second resistor and a second capacitor, and the second resistor and the second capacitor are connected in series between the input terminal and the output terminal of the current mirror. (A sixth configuration.)

In the power control device according to the fifth or sixth configuration described above, preferably, the current mirror includes a first transistor and a second transistor, and the delay circuit includes a third resistor and a third capacitor. The third resistor may be connected between the control terminal of the first transistor and the control terminal of the second transistor, and the third capacitor may be connected between the control terminal of the second transistor and a constant potential terminal. (A seventh configuration.)

In the power control device according to any of the first to seventh configurations described above, preferably, the output feedback circuit includes an error amplifier configured to generate an error signal corresponding to the difference between the output voltage or the feedback voltage and a predetermined reference voltage. (An eighth configuration.)

In the power control device according to the eighth configuration described above, preferably, the output feedback circuit controls the characteristics of the error amplifier according to the current feedback signal. (A ninth configuration.)

For example, according to another aspect of what is disclosed herein, a power supply device includes the power control device according to any of the first to ninth configurations described above. (A tenth configuration.)

With the disclosure herein, it is possible to provide a power control device and a power supply device with enhanced load response characteristics.

Further Modifications

The various technical features disclosed herein may be implemented in any other manners than in the embodiments described above, and allow for any modifications made without departure from their technical ingenuity. For example, any bipolar transistor may be replaced with a MOS field-effect transistor and vice versa; the logic levels of any signal may be inverted. That is, the embodiments described above should be taken to be in every aspect illustrative and not restrictive, and the technical scope of the present disclosure is understood to be defined not by the description of the embodiments given above but by the appended claims and encompass any modifications within a scope and sense equivalent to those claims.

The invention claimed is:

1. A power control device configured to serve as a main controlling agent in a power supply device which generates an output voltage from an input voltage using an output transistor, the power control device comprising:

an output feedback circuit configured to receive the output voltage or a feedback voltage corresponding to the output voltage to generate a driving signal for the output transistor;

a current feedback signal generation circuit configured to generate a current feedback signal for adjusting phase characteristics of the output feedback circuit according to an output current of the power supply device, the current feedback signal generated according to a mirror current gained by mirroring the output current; and a delay circuit configured to delay a change in the mirror current in response to a change in the output current, wherein the current feedback signal generation circuit includes:

a mirror transistor configured to be driven according to the driving signal so as to generate a mirror current corresponding to the output current; and a current mirror configured to generate the current feedback signal from the mirror current, the delay circuit includes a first resistor and a first capacitor, the first resistor is connected between an application terminal for the driving signal and a control terminal of the mirror transistor, and the first capacitor is connected between the control terminal of the mirror transistor and a main electrode of the mirror transistor.

2. The power control device according to claim 1, wherein the delay circuit gives the driving signal a delay to generate a delayed driving signal, the delay circuit feeding the delayed driving signal to a control terminal of the mirror transistor.

3. The power control device according to claim 1, wherein the delay circuit delays a change in the current feedback signal output from the current mirror in response to a change in the mirror current input to the current mirror.

4. The power control device according to claim 3, wherein the delay circuit includes a second resistor and a second capacitor, and the second resistor and the second capacitor are connected in series between an input terminal and an output terminal of the current mirror.

5. The power control device according to claim 3, wherein the current mirror includes a first transistor and a second transistor, the delay circuit includes a third resistor and a third capacitor, the third resistor is connected between a control terminal of the first transistor and a control terminal of the second transistor, and the third capacitor is connected between the control terminal of the second transistor and a constant potential terminal.

6. The power control device according to claim 1, wherein the output feedback circuit includes an error amplifier configured to generate an error signal corresponding to a difference between the output voltage or the feedback voltage and a predetermined reference voltage.

7. The power control device according to claim 6, wherein the output feedback circuit controls characteristics of the error amplifier according to the current feedback signal.

8. A power supply device comprising the power control device according to claim 1.

9. The power control device according to claim 1, wherein the output feedback circuit includes an error amplifier configured to generate an error signal corresponding to a difference between the output voltage or the feedback voltage and a predetermined reference voltage, and the current feedback signal is fed back to the error amplifier.

10. A power control device configured to serve as a main controlling agent in a power supply device which generates an output voltage from an input voltage using an output transistor, the power control device comprising:

an output feedback circuit configured to receive the output voltage or a feedback voltage corresponding to the output voltage to generate a driving signal for the output transistor;

a current feedback signal generation circuit configured to generate a current feedback signal for adjusting phase characteristics of the output feedback circuit according to an output current of the power supply device, the current feedback signal generated according to a mirror current gained by mirroring the output current; and a delay circuit configured to delay a change in the mirror current in response to a change in the output current, wherein the current feedback signal generation circuit includes:

a mirror transistor configured to be driven according to the driving signal so as to generate a mirror current corresponding to the output current; and a current mirror configured to generate the current feedback signal from the mirror current, the current mirror includes a first transistor and a second transistor, the delay circuit includes a third resistor and a third capacitor, the third resistor is connected between a control terminal of the first transistor and a control terminal of the second transistor, and the third capacitor is connected between the control terminal of the second transistor and a constant potential terminal.

11. The power control device according to claim 10, wherein the delay circuit delays a change in the current feedback signal output from the current mirror in response to a change in the mirror current input to the current mirror.

12. The power control device according to claim 10, wherein the output feedback circuit includes an error amplifier configured to generate an error signal corresponding to a difference between the output voltage or the feedback voltage and a predetermined reference voltage.

13. The power control device according to claim 12, wherein the output feedback circuit controls characteristics of the error amplifier according to the current feedback signal.

14. A power supply device comprising the power control device according to claim 10.

15. The power control device according to claim 10, wherein the output feedback circuit includes an error amplifier configured to generate an error signal corresponding to a difference between the output voltage or the feedback voltage and a predetermined reference voltage, and the current feedback signal is fed back to the error amplifier.

* * * * *